Dec. 6, 1932.    J. M. LARSEN    1,889,991
ELECTRIC WELDING TOOL
Filed Sept. 29, 1930

Inventor
John M. Larsen
By Lawrence and
Van Antwerp
Attorneys

Patented Dec. 6, 1932

1,889,991

UNITED STATES PATENT OFFICE

JOHN M. LARSEN, OF GRAND RAPIDS, MICHIGAN

ELECTRIC WELDING TOOL

Application filed September 29, 1930. Serial No. 485,011.

This invention relates to a welding apparatus and more generally to a combined holding and welding tool which is adapted to be used in the joining of two metal members. One disadvantage of welding units is that they are more or less cumbersome due to the power wires which necessarily lead thereto and it is an object of this invention to provide a sort of "trolley" conductor adjacent to the pieces of metal which are to be welded thus eliminating the power lines which are usually fastened to the welding unit.

Another object of this invention is to equip the improved welding tool with an automatic control switch which will function so as to give a surge of electricity through the parts adapted to be welded at that instant when such is desired. That is to say, when the several parts are in proper aligned position the switch contact operates and the several parts are immediately and quickly welded with a minimum amount of time and electricity.

Another feature of my invention is the pivoted arrangement of the tool proper whereby the several members may be clamped and held during the welding manipulation.

Still another advantage lies in my improved type of electric switch whereby a contact is maintained only for an instant thus economizing the electric welding current.

Other objects, advantages and meritorious qualities reside in the structure, combination and arrangement of the various elements forming the invention as more fully hereinafter described and claimed, reference being had to the accompanying drawing forming a part hereof, wherein:

Similar numerals respect similar parts throughout the several views.

Figure 5:
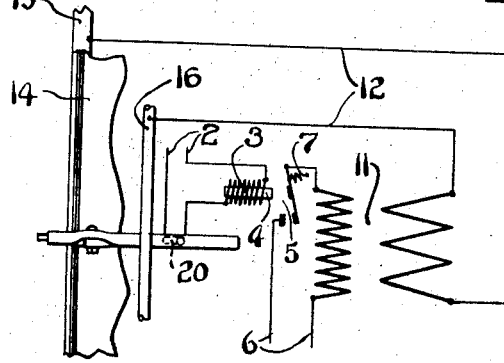
Fig. 5 is a schematic plan view showing the general arrangement of the several parts.

Referring particularly to Fig. 5, 2 indicates the incoming power circuit of ordinary voltage, the same being adapted to pass through my improved switch, indicated generally by 20, and being in series with the solenoid 3. The solenoid 3, when energized, draws back the plunger 4 and closes the contact 5 thus completing the circuit 6. This circuit may transmit 440 volts.

The numeral 12 indicates the other side of the transformer circuit, this circuit being closed through the frame member 13, such as the side member of an automobile chassis, the sheet metal strips 14 placed immediately thereabove, the conductor member 15 of the pivoted tool or clamping means, and the trolley member 16. Usually one of the strips 14 has been previously welded in position.

From the above it will be seen that when the switch 20 is closed the current will flow through the solenoid 3 which acts as a relay and causes a surge of the 440 volt current through the circuit 6 thus energizing the transformer 11. The spring 7 breaks this circuit after the flow of current through the solenoid has ceased. When this occurs the conductor member 15 of the tool is situated as shown in Fig. 1 and thus the current flows through the members 13 and 14 welding them together in a manner cognizant to those skilled in this art.

Figure 1:
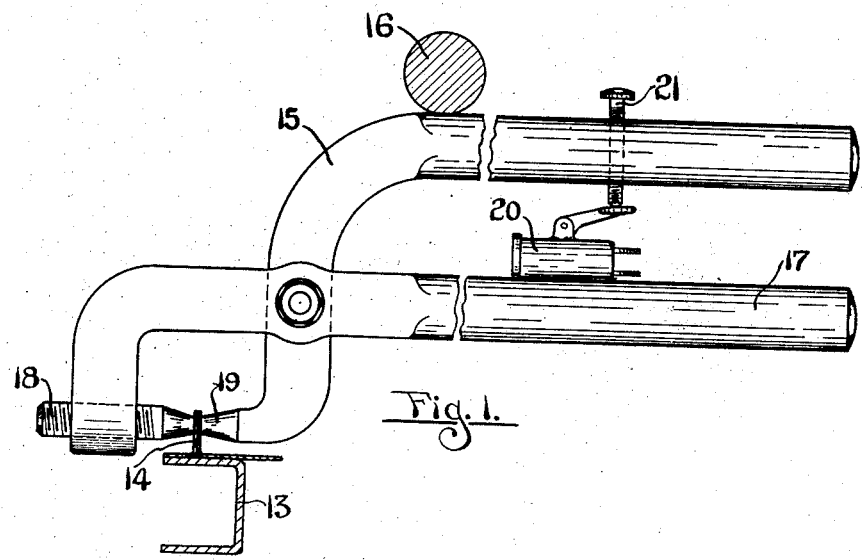
Fig. 1 is a side elevation of my improved welding tool showing the same in operative position.
Figure 2:
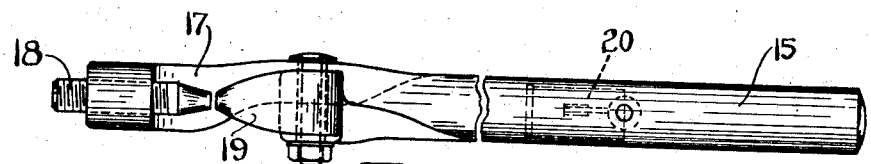
Fig. 2 is a plan view of the tool proper.
Figure 4:
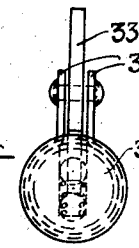
Fig. 4 is an end view of Fig. 3.

The lower member 17, see Fig. 1, of the tool proper, has an adjusting element 18 passing therethrough and serves as an abutment for the tapered lower end 19 of the upper member 15. The upper member 15 has a set screw 21 adjustably threaded therethrough, the purpose of which will later be set forth. The joint between the members 15 and 17 is insulated in order that the flow of current may be only through the member 15. Or, if desired, the member may be of a nonconductive material.

Figure 3:
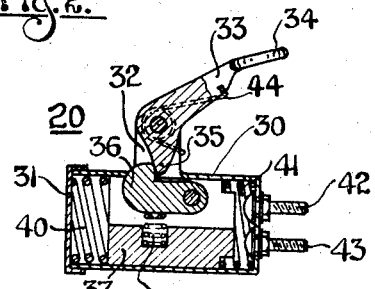
Fig. 3 is a longitudinal cross sectional view taken through the switch structure.

Referring particularly to Fig. 3, 30 indicates a cylindrical casing which is closed at one end by the cap 31 and which has upstanding ears 32 between which a bell crank 33 is pivotally mounted. The upper end of this crank is flattened as at 34, thereby forming a seat for the lower end of the set screw 21 and the lower end 35 is adapted to engage with the hooked member 36 pivotally mounted on the slide 37 interiorly of the casing 30. The slide 37 is recessed and adapted to receive a spring 38 which presses against the hooked member 36 and forces it upwardly into engagement with the lever 33. A spring 40 is positioned to the left of the sliding block 37 and a much lighter and weaker spring 41 is positioned at the opposite end of the sliding block. The material from which the block is composed is such as to conduct electricity whereas the casing 30 is of any suitable insulating material. Contacts 42 and 43 extend through the end of the casing as clearly shown in Figs. 1 and 3, and are connected in the circuit 2 as indicated in Fig. 5.

Thus, when the set screw 21 presses against the bell crank lever 33, the lower end 35 thereof abuts against the hooked member 36 forcing it to the left. This causes the block 37, on which it is mounted, to move to the left until the casing, pushing against the curved end of the hooked member 36, causes it to be depressed thus releasing the bell crank member 33 therefrom. When this occurs, the spring 40 causes the block 37 to slide rather violently to the right and thus come into contact with the inner ends of the contacts 42 and 43 thus completing the circuit 2. When this circuit is completed the transformer 11 functions and a current of heavy amperage surges through the several pieces which are to be welded together and causes such welding to occur. This class or kind of welding is known as resistance welding.

It is to be noted that the set screw 21 and the abutting screw 18, see Fig. 1, are adjusted in order that the contact may occur at the proper moment. In other words, these adjustments must be so regulated as to allow the operator of the welding tongs or tool to grasp the pieces 14 therein, then raise the uper member of the tongs against the trolley 16 and at the same time tighten the handles of the tongs or tool thus causing actuation of the switch 20 to occur. After the welding has occurred the spring 41, which is comparatively light in character, gradually forces the sliding block 37 to its normal position. Then as the tool is removed the members 15 and 17 are separated and the spring 44 rotates the bell crank to its initial position. Now, the device is again ready for operation.

The invention is defined in the appended claims and is to be considered comprehensive of all forms of structure coming within their scope.

I claim:

1. A welding system comprising an electricity conducting trolley, clamping members adapted to receive the work therebetween, a source of electrical energy adapted to be connected to the trolley, and means controlling the application of the electrical energy to the trolley mounted upon the clamping members and actuated by their movement, said clamping members adapted to be manually held against the trolley during the energization of the same.

2. A welding tool comprising two members pivotally mounted together intermediate their ends whereby inward movement of corresponding ends causes similar movement of the opposite ends, contacts on one set of ends and electrical switch means mounted upon the other set of ends, said switch means being automatically operated by movement of the said members.

3. A welding tool comprising an L-shaped member having abutting means extending therefrom near the end of the shorter leg and at right angles thereto, another member crossing the longer leg of the L-shaped member and pivotally attached thereto, said last mentioned member having contact means adjacent the aforesaid abutting means and formed of a metal capable of readily conducting electricity, handle means on the ends of the members opposite to the contact ends, a switch mounted on one of the members and means on the other member adapted to contact therewith.

4. A welding tool comprising two relatively movable members, contact means on the respective members, said contact means coming together upon a certain relative position of the two movable members, means for electrically energizing said contact means including a switch mounted upon one of the said members and means to operate the switch on the other.

5. A welding device comprising two movable members, contacts on said members brought together by their movement, and switch means closed by the movement of said members to a contacting position for the purpose described.

In testimony whereof I affix my signature.

JOHN M. LARSEN.